United States Patent
Andrews et al.

[11] Patent Number: 5,885,445
[45] Date of Patent: Mar. 23, 1999

[54] BELT PRESS FOR DEWATERING SLUDGE

[75] Inventors: Michael John Andrews, Frimley; Christopher Bosher, Reading, both of England

[73] Assignee: Thames Water Utilities Limited, Berks, England

[21] Appl. No.: 795,400

[22] Filed: Feb. 5, 1997

[30] Foreign Application Priority Data

Feb. 5, 1996 [GB] United Kingdom .................... 9602245

[51] Int. Cl.$^6$ .......................... B01D 17/12; B01D 33/056
[52] U.S. Cl. .............................. 210/90; 100/50; 100/152; 100/153; 210/94; 210/143; 210/386; 210/400
[58] Field of Search .................................. 210/85, 90, 94, 210/96.1, 110, 134, 143, 103, 104, 387, 400, 401, 739, 741, 744, 745, 746, 783, 210–386; 100/50, 116, 151, 152, 153

[56] References Cited

U.S. PATENT DOCUMENTS

| | | | |
|---|---|---|---|
| 4,228,353 | 10/1980 | Johnson . | |
| 4,341,628 | 7/1982 | Fujinami et al. | 210/103 |
| 4,495,070 | 1/1985 | Pierson | 210/400 |
| 4,587,023 | 5/1986 | Srivatska et al. | 210/744 |
| 4,602,998 | 7/1986 | Goron | 210/400 |
| 4,612,123 | 9/1986 | Eustacchio et al. | 210/96.1 |
| 4,879,033 | 11/1989 | Rich | 210/401 |
| 5,021,166 | 6/1991 | Torpey | 210/96.1 |
| 5,133,872 | 7/1992 | Baldwin | 210/745 |
| 5,259,952 | 11/1993 | Lee | 210/400 |
| 5,380,440 | 1/1995 | Chipps | 210/745 |
| 5,635,074 | 6/1997 | Stenstrom et al. | 210/739 |

Primary Examiner—Joseph W. Drodge
Attorney, Agent, or Firm—Evenson, McKeown, Edwards & Lenahan, P.L.L.C.

[57] ABSTRACT

This invention relates to a belt press for dewatering sludge, such as sewage sludge. The press includes a camera to monitor physical operation of a gravity belt section of the press. A numerical control device uses electromagnetic radiation received from the gravity belt section to control the physical operation of the gravity belt section. An actuator device may be used to control a height of a weir for distribution of the sludge over the gravity belt section, and another actuator device may be used to control positions of ploughs which plough the sludge.

11 Claims, 1 Drawing Sheet

BELT PRESS FOR DEWATERING SLUDGE

The invention relates to a belt press, and particularly to means associated with the operational control thereof.

Sludge is traditionally dewatered in a press such as a Klampress on which sludge is fed onto a continuous belt conveyor which has a gravity belt section where water is drained from the sludge by gravity prior to final pressing to remove as much water as possible. The sludge is usually flocculated by the addition of polymer flocculant upstream of the gravity belt section. However, the operation and control of the belt press are to a certain extent controlled by various physical characteristics of the belt press, particularly those associated with the gravity belt section. Such characteristics have previously been determined using intrusive methods in which, in taking measurements, the characteristics of the sludge are themselves adversely affected, which is a disadvantage. Moreover, sensor devices become clogged by ingredients of the sludge, again leading to lack of reliable control. As a result, operators overdose the polymer flocculant in order to try to ensure correct belt press operation, despite changes of sludge characteristics during operation.

It is accordingly an object of the invention to seek to mitigate these disadvantages.

According to the invention, there is provided a belt press for dewatering sludge comprising means to monitor and control physical operation of a gravity belt section of the press utilizing electromagnetic radiation received from the gravity belt section.

The means may comprise a camera and a numerical control device for controlling physical operation of the gravity belt section. This is a relatively simple way of effecting monitoring and control, particularly when the numerical control device may comprise a computer device.

There may be an actuator device actuated by the camera and computer device to control the speed of the belt dependent on the thickness of sludge on the belt.

The belt press may comprise an actuator device to control the height of a weir for distribution of sludge over the belt.

The belt press may comprise an actuator device for adjusting position of a polymer means for ploughing the sludge.

The plough means may comprise a plurality of separate plough means with a respective actuator device.

Each actuator device may comprise an electronically operated rotational actuator and an elongate threaded member for adjusting the height of the weir and/or plough means.

The elongate threaded member may comprise a threaded bar terminating at an end remote from the actuator device in a free turning joint.

There may be a pressure sensor means to determine the pressure of a plough means on the gravity belt section.

The pressure sensor means may comprise a pressure sensor between the plough and a plough bar mounting the same.

A belt press embodying the invention is hereinafter described, by way of example, with reference to the accompanying drawings.

Figure 1:
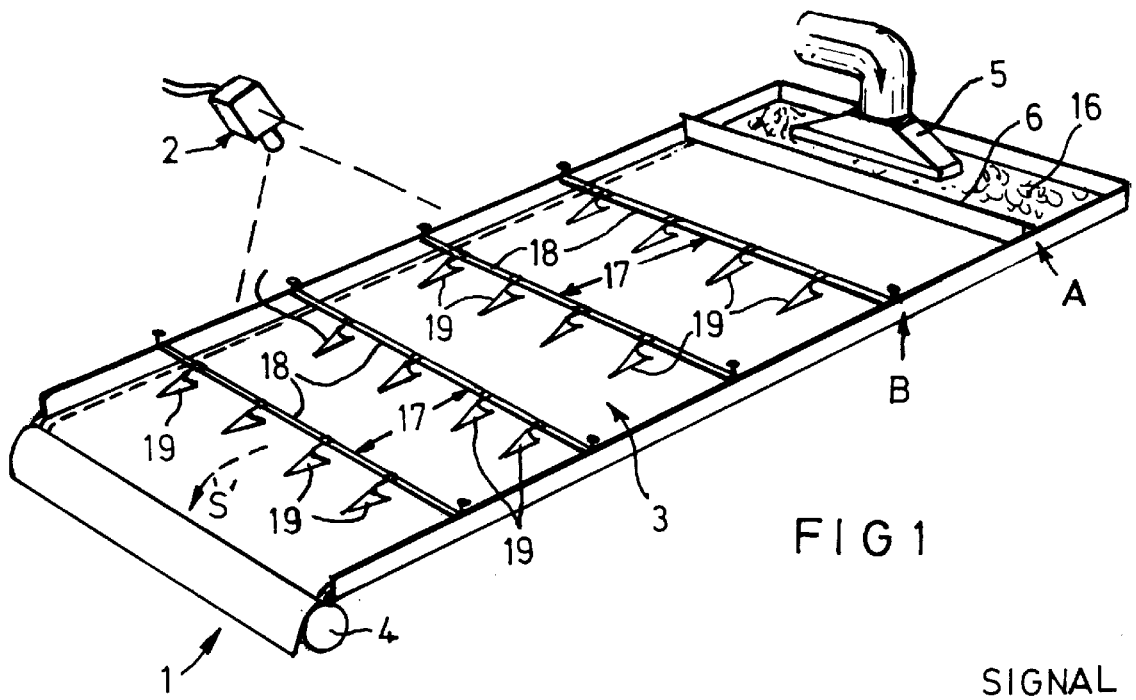
FIG. 1 is a schematic perspective view of a belt press according to the invention.

Referring to the drawings there is shown a belt press 1 for dewatering sludge, normally sewage sludge, comprising means 2 to monitor and control physical operation of a gravity belt section 3 of the press 1 utilising electromagnetic radiation received from the gravity belt section 3.

The monitoring and control means 2 comprises, in the illustrated embodiment, a camera mounted over the gravity belt section 3 in or on an odor screen (not shown) above (as viewed) the belt section 3. The camera 2 receives an image via incident electromagnetic radiation received from the gravity belt section 3. The image from the camera is transmitted to a numerical control device such as a computer (not shown) which analyses the data and actuates and controls various physical characteristics of the gravity belt section 3 so as to optimise operation of the press belt 1.

In order to do this, the computer has programmed into it optimum physical operational characteristics of the gravity belt section 3 for various sludge and polymer flocculant combinations being dewatered, as well as data previously collected in previous operational procedures. Using suitable "look up" schedules, the computer will then adjust physical operation of the belt press for optimum dewatering results, which will result in the embodiment described with reference to the drawings operating with optimum use or dosing of polymer flocculant. This leads to efficient operation and reductions in "down time" and excess use of polymer flocculant.

The image received from the camera 2 can be at any sensible part of the spectrum such as, for example, infra-red, although in the embodiment the camera is a visual image receiving camera.

The camera 2 is directed to the belt, receives a visual image of the sludge thereon, which is converted to electronic information by the computer device, which compares that information and adjusts physical characteristics of the gravity belt section 3 accordingly, as necessary, to provide for optimum dewatering and uniform sludge. Thus, the computer means may actuate an actuator means for controlling the belt speed in the gravity belt section, depending on the image received. Thus if the sludge is too thick, the belt speed is increased by increasing the rotational speed of a driver roller or rotor 4, and if the sludge is too thin, the belt speed is decreased by decreasing the speed of the roller 4, again via a signal from the computer.

The sludge is fed to the belt 3, which can be a foraminous mesh belt, so that water passes through by gravity to dewater the sludge, from a sludge feed head 5 upstream of a weir 6, the sludge being passed under the weir. The weir 6 is a generally planar plate mounted at each side of the belt press on upstanding side walls 7 thereof. The weir 6 at each side has an extension 8 and enlarged weir end 9 in the form of a plate lying in a plane substantially at 90° to the plane of the weir 6, the plate 9 being substantially parallel to and spaced apart from and over a boss or further plate 10 including a socket 11 in which an unthreaded enlarged or mushroom head 12, of an elongate member 13 in the form of a threaded rod or bar is received. The threaded rod 13 is in threaded engagement with a hole 14 in the plate 9 through which it passes to an electronic actuator 15 adapted to receive a signal from the computer device. There may be an actuator device for the weir at each end of the weir 6, though only one is shown in FIG. 2.

Figure 2:
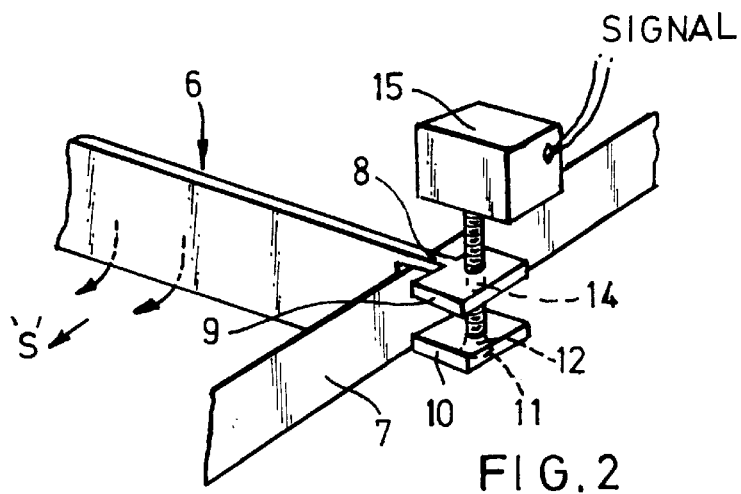
FIG. 2 is an enlarged view on part A of FIG. 1.

The camera, not shown in FIG. 2, receives an image of the flocculated sludge being dewatered and that image is converted electronically to data in the computer means and compared with optimum data for the sludge being dewatered. The computer means sends a signal to actuate the or each actuator means 15 for raising or lowering one or both ends of the weir as necessary, by rotating the rod 13, clockwise or anti-clockwise, in order to control the thickness and distribution of the flocculated sludge passing from a receiving area 16 of the belt under the weir 6 and onto the gravity belt section 3 along which it passes with the belt in the flow direction 'S'.

Stated in another way, the signal from the computer device is signal driven by the camera recognition of poor or incorrect sludge distribution on the gravity belt section 3.

A similar result could be obtained by controlling the actual sludge delivery rate through sludge pump inverters, but maintaining a fixed belt speed. Thus the control of sludge pump speed controls the speed of sludge flow rate so that it can be either increased or decreased.

Figure 3:
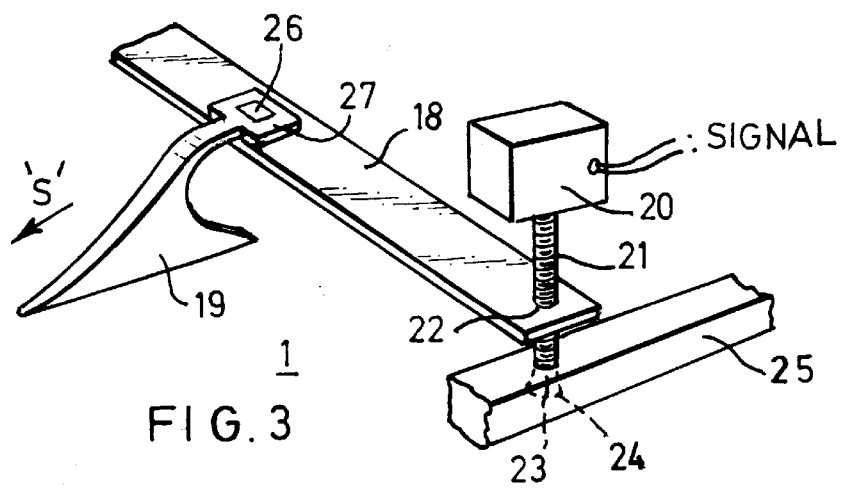
FIG. 3 is an enlarged view on part B of FIG. 1.

Referring now to FIG. 3, there is plough means 17 (FIG. 1) each in the form of a plurality of plough bars 18, which are substantially parallel one with another, and each of which carries a plurality of ploughs 19 spaced apart over the length thereof. The plough bars 18 are each adjusted in height by a rotational actuator device 20 actuated by a signal from the computer device, the rotational actuator device 20 rotating a threaded rod or bar 21 clockwise or anti-clockwise, depending on the signal. The rod or bar 21 passes through a threaded hole 22 in the plough bar 18 and has an enlarged or mushroom head 23 captive in a hole 24 in a plough bar support/press edge 25. The head 23 is essentially a free turning or "universal joint" type socket, as with the mounting for the weir 6 of FIG. 2. The threaded rod or bar 27 is thus free to turn.

In use, as the camera 2 recognises incorrect plough adjustment via the visual image and this is monitored by the computer device, the compute device generates a control signal which is sent to the rotational actuator 20 to screw the plough bar 18 up or down as necessary. This allows the plough(s) 19 to mix the sludge as desired.

All the plough bars 18 may be controlled in unison. Alternatively, each plough bar 18 can be adjusted independently, giving fine adjustment.

In a further embodiment, each plough 19 is controlled depending on whether the plough is pressed too hard or too lightly against the belt, the pressure being monitored by a pressure sensor 26 between the plough 19 and a mounting 27 of the plough 19 on the plough bar 18.

In combination with the foregoing, the signal from the computer devices may control dosing of polymer flocculant.

We claim:

1. A belt press for dewatering sludge, comprising:

a monitor of physical operation of a gravity belt section of the press;

a control of the operation of the press responsive to electromagnetic radiation received from the gravity belt section;

a weir under which the sludge is passed; and an actuator device to control a height of said weir for distribution of the sludge over said gravity belt section;

wherein the actuator device comprises an electronically operated rotational actuator and an elongate threaded member for adjusting the height of the weir.

2. A belt press as defined in claim 1, wherein the monitor comprises a camera and the control comprises a numerical control device for controlling physical operation of the gravity belt section.

3. A belt press as defined in claim 2, wherein the numerical control device comprises a computer device.

4. A belt press as defined in claim 3, wherein the computer device controls the speed of the belt section dependent on the thickness of the sludge on the belt section.

5. A belt press as defined in claim 1, and further comprising an actuator device for adjusting a position of a plough element for ploughing the sludge.

6. A belt press as defined in claim 5, wherein the plough element comprises a plurality of separate ploughs each having a respective actuator device.

7. A belt press as defined in claim 5, wherein the actuator device for adjusting the position of the plough element comprises an elongate threaded member for adjusting the plough element.

8. A belt press as defined in claim 7, wherein the elongate threaded member for adjusting the plough element comprises a threaded bar terminating at an end remote from the actuator device for adjusting the position of the plough element in a free turning joint.

9. A belt press as defined in claim 1, wherein the elongate threaded member comprises a threaded bar terminating at an end remote from the actuator device in a free turning joint.

10. A belt press for dewatering sludge, comprising:

a monitor of physical operation of a gravity belt section of the press;

a control of the operation of the press responsive to electromagnetic radiation received from the gravity belt section;

a plough element; and a pressure sensor operable to determine the pressure of the plough element on the gravity belt section.

11. A belt press as defined in claim 10, wherein the pressure sensor is located between the plough element and a plough bar mounting the plough element.

* * * * *